United States Patent Office 3,381,196
Patented Apr. 30, 1968

3,381,196
SYSTEM FOR CONTROLLING EXCITATION TO SYNCHRONOUS MOTOR DURING STARTING
Gerard M. Larose, Milwaukee, Wis., assignor to Allis-Chalmers Manufacturing Company, Milwaukee, Wis.
Filed Oct. 21, 1965, Ser. No. 499,257
11 Claims. (Cl. 318—176)

ABSTRACT OF THE DISCLOSURE

A system for controlling excitation to a synchronous motor during starting is responsive to the current induced in the motor field winding to turn on excitation switching thyristors to connect a source of excitation to the field winding when the motor attains a predetermined speed. Sensing means provide an output dependent upon the polarity of the induced field winding current appearing across a discharge resistor, and timing means measure the duration of one polarity output from the sensing means, which is a measure of the wave length of the induced field current, and turn on a latching circuit when the slip frequency is sufficiently low. Pulse generating means are responsive to the latching circuit output to produce a pulse after each negative output from the polarity sensing means for triggering on the excitation switch thyristors. The pulse generating means also produce a triggering pulse to the excitation switching thyristors during each negative half cycle of induced field current if the motor pulls out of synchronization. In the event that the motor synchronizes by itself, a delayed pulse generating means produces a signal to trigger on the excitation switching thyristors.

---

This system relates to control systems, particularly systems that control the application of excitation during the starting of a synchronous motor.

Synchronous motor starting systems usually provide means for controlling the time that excitation is applied to the field winding. Most system utilize means responding to the induced current in the field winding during the starting period. The induced current is sensed and when its frequency reaches a predetermined low value the system operates to connect the excitation power source to the field winding.

This invention, in addition to controlling the application of excitation power, also provides a control system that can be made part of the rotating structure of a synchronous motor. Therefore, no commutator rings are required and the system can be used in a brushless synchronous motor starting system application.

With this invention, a synchronous motor starting system is provided that may be used in a brushless excitation system. It provides means for switching on several static switching devices, such as thyristors, in series in the excitation field winding circuit so that practical levels of excitation voltage can be adequately handled. The system also provides a discharge path across a discharge resistor for the induced field current during starting.

The objects of this invention are to provide a new and improved synchronous motor starting system; to provide a new and improved brushless excitation system; to provide a synchronous motor starting system that will reapply excitation automatically after pullout of the synchronous motor; to provide a synchronous motor starting system that applies the excitation at the proper phase relationship between the rotor and stator fields; and to provide a synchronous motor starting system that applies excitation if the synchronous motor synchronizes on starting and without inducing any significant alternating voltage across the discharge resistor.

Figure 1:
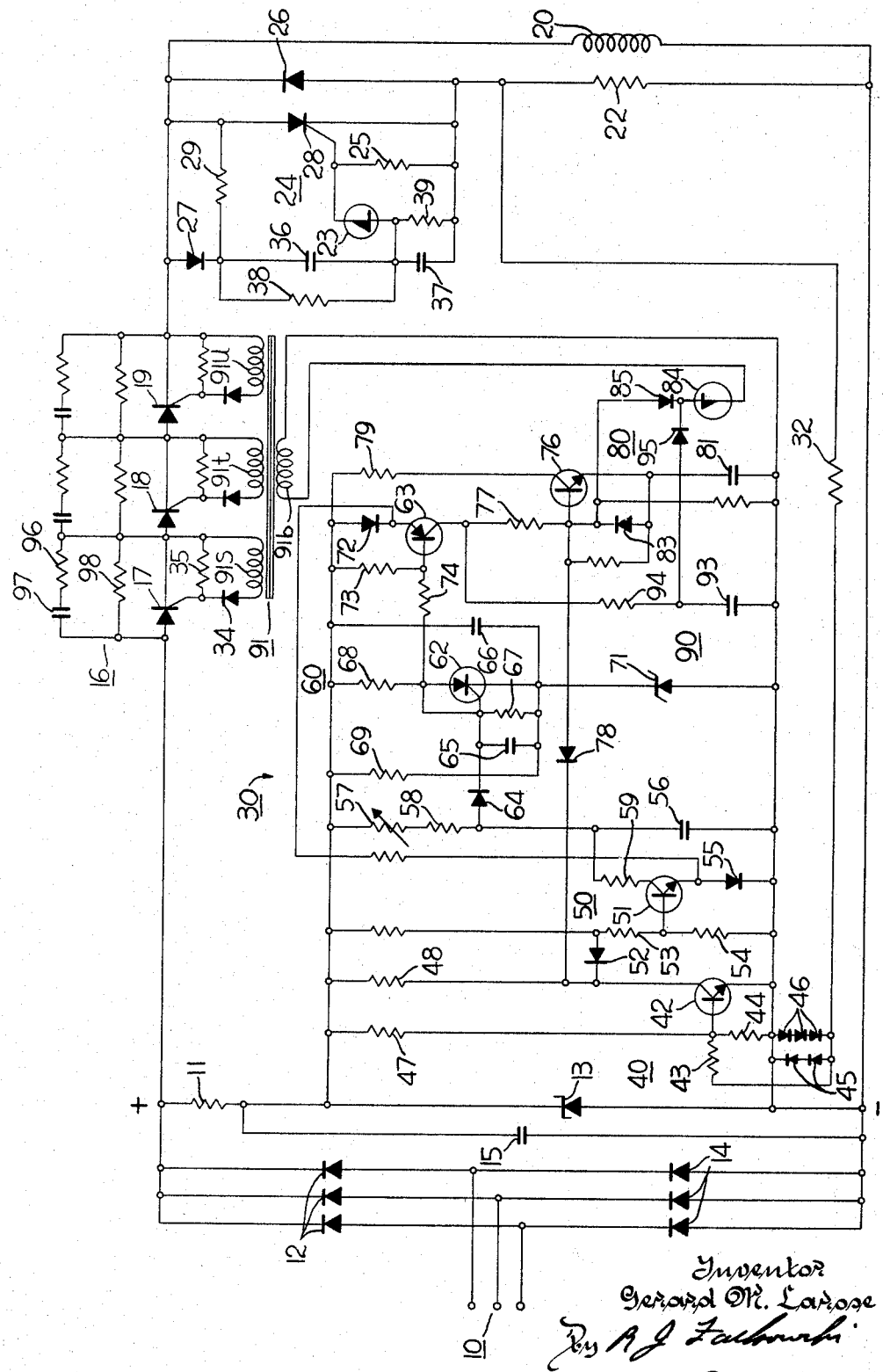

FIG. 1 is a schematic drawing of an embodiment of this invention; and FIG. 2 shows two typical wave forms of the induced field current during starting.

Referring to FIG. 1, a means for applying excitation current 10 is provided from a source (not shown) of three phase alternating current through bridge diodes 12 and 14. In a brushless excitation system the excitation power is usually provided by a generator or a rotating transformer having its output windings mounted on the rotor shaft. In this embodiment the excitation power is shown as supplied from a three phase system. However, the system may use a single phase power source in which case a single phase, full wave bridge rectifier would be used to provide the excitation power and the energy for the operation of the control circuitry.

An excitation switching means 16 is provided to connect the excitation source to the field winding. This means comprises switching devices such as thyristors 17, 18 and 19 connected between excitation source 10 and a field winding 20 of a synchronous motor (not fully shown).

During starting of the synchronous motor, the induced field current in field winding 20 flows through a discharge resistor 22 and a discharge switching means 24. The discharge switching means comprises a diode 26 that passes current during one-half cycle of the induced field current and a silicon controlled rectifier 28 that passes current during the other half cycle.

Power for the operation of a control means 30 is provided by excitation means 10. The excitation energy is applied to the control means through a dropping resistor 11 and a Zener diode 13 connected across a filter capacitor 15. Zener diode 13 provides a relatively constant voltage level for the operation of control means 30 and capacitor 15 filters out most of the alternating current ripple from excitation source 10.

Control means 30 is connected to field discharge resistor 22 through a current limiting resistor 32 and receives an in phase measure of the induced field current magnitude. The control means comprises a polarity sensing means 40 that responds to the induced field current and produces an output dependent on the polarity of the induced field voltage appearing across discharge resistor 22.

Polarity sensing means 40 comprises a transistor 42, a current limiting resistor 43 connected to the base of transistor 42, and a leakage resistor 44 for passing leakage current. Two series connected diodes 45 are connected between the base and emitter of transistor 42 to clamp the positive input voltage to transistor 42, and three series connected diodes 46 are connected in the opposite direction of polarity between the base and emitter of transistor 42 to protect the transistor from excessive reverse voltage. A resistor 47 is connected in the base circuit of transistor 42 and provides current to the base of transistor 42 sufficient to keep it turned on when there is no voltage induced across discharge resistor 22. A load resistor 48 is connected in the collector circuit of transistor 42.

Polarity sensing means 40 is responsive to the polarity of the induced field current and is biased to remain on if no alternating voltage appears across discharge resistor 22. If the motor synchronizes without the application of excitation, polarity sensing means 40 remains on, and control means 30 operates to connect excitation means 10 to field winding 20.

Usually the motor does not synchronize without excitation, and as the motor speed increases the induced alternating voltage across resistor 22 decreases in frequency and increases in wave length. Transistor 42 is turned off when its forward bias is overcome during each negative portion of the induced voltage and is turned on just before the voltage goes positive. The output of transistor 42 is applied to timing circuit 50. The timing circuit comprises a transistor 51, a diode 52, a reverse biasing resistor 53, a leakage resistor 54, a reverse biasing diode 55, a timing capacitor 56, and a current limiting resistor 59.

When transistor 42 is turned on, transistor 51 is turned off. This occurs because the base of transistor 51 is connected through resistor 54 to the negative potential of the excitation source. With transistor 51 turned off, timing capacitor 56 charges through a potentiometer 52 and a limiting resistor 58 at a rate selected by the setting of potentiometer 57. Since the period of time that transistor 51 remains off allows timing capacitor 56 to charge, capacitor 56 and potentiometer 57 provide means for measuring the wave length of the induced field current.

When the wave length is sufficiently long so that capacitor 56 charges to a preselected level before the turn-off of transistor 42 turns on transistor 51 to discharge timing capacitor 56, the potential of capacitor 56 reaches a level that turns on a latching and level sensing circuit 60. The latching circuit comprises a thyristor 62, a transistor 63, a blocking diode 64, transient suppression capacitors 65 and 66, a leakage resistor 67, a current limiting resistor 68, a resistor 69, a Zener diode 71, a reverse biasing diode 72, a leakage resistor 73, and a current limiting resistor 74. When the potential of timing capacitor 56 becomes sufficiently positive and if the voltage from excitation source 10 is above a level determined by the breakover voltage of Zener diode 71, the timing capacitor voltage turns on thyristor 62.

When thyristor 62 turns on it makes the base of transistor 63 negative relative to its emitter and transistor 63 turns on. Once thyristor 62 and transistor 63 are turned on, they remain on regardless of changes in the conditions of transistor 42 and transistor 51.

The turning on of transistor 63 connects the base of a transistor 76 to the positive terminal of the excitation source through a limiting resistor 77. The base of transistor 76 is clamped to a negative potential by the turned on transistor 42 through a blocking diode 78 during that portion of the induced current cycle that charging of timing capacitor 56 occurs. However, as soon as transistor 42 turns off, as it does just after the start of each negative half cycle, transistor 76 is released from the clamping potential and is turned on. Transistor 76 then functions as a part of a pulse generating means 80 for providing an output switching signal. The turning on of transistor 76 allows current to flow from the positive terminal of the excitation source through resistor 11 and a collector resistor 79 to an energy storage capacitor 81. When capacitor 81 charges to a voltage high enough to break over a breakover diode 84 it discharges through a reverse biasing diode 83, a blocking diode 85, breakover diode 84, and the primary winding 91p of a transformer 91. A breakover diode is a diode that has negative resistance characteristics and turns on, becoming a low impedance, when the voltage across it reaches a breakover level and remains on until the current through the diode drops below a holding level. The turning on of breakover diode 84 passes a current pulse through primary winding 91p that triggers on excitation switching means 16.

Thus in the operation of control means 30, when the frequency of the induced current becomes low enough, that is, the wave length increases to a level selected by the adjustment of potentiometer 57 and timing capacitor 56, latching circuit 60 operates and places pulse generating means 80 in a condition to pass the output switching signal to winding 91p. The pulse is passed when transistor 42 turns off to remove the clamp from the base of transistor 76. This assures that the application of excitation current occurs when the induced field current is going through zero to a polarity opposite to the polarity that charges capacitor 56. This is the polarity of induced current opposite to the polarity of the excitation source, as shown in FIG. 1, and is considered a desirable time to apply excitation to obtain maximum machine pull-in torque. The capacitance of capacitor 81 and the resistances in its charging circuit are selected to produce the triggering output signal substantially instantaneously relative to the period of the induced current wave shape, with the turning off of transistor 42.

Pulse generating means 80 also operates to produce a pulse during the start of each negative half cycle of the induced field current in the event that the motor pulls out of synchronization and loses excitation. In this event it is desirable to continually apply the triggering signal to switching means 16 at the start of each negative half cycle. This is accomplished by selecting the resistance of resistor 77 so that the current through breakover diode 84 is less than its holding current and it turns off after the discharge of capacitor 81. Reverse biasing diode 83 insures that transistor 76 is turned off and that current must flow through resistor 77 rather than resistor 79 to breakover diode 84. When transistor 42 turns off as it does at the start of each negative half cycle, and since the time constant of resistor 79 and capacitor 81 is short, it takes a very short time to turn on breakover diode 84 and pass the triggering signal through primary winding 91p.

A delayed pulse generating means 90 that comprises a capacitor 93 and a resistor 94 is provided for passing a triggering signal through transformer 91 in the event that the motor synchronizes by itself. In this case there would be no induced field current and transistor 42 would not switch between two states. Since transistor 42 is biased to remain on when not receiving an input, timing circuit 50 operates after the selected timing interval to turn on latching circuit 60. When latching circuit 60 turns on, current begins flowing through diode 72, transistor 63 and resistor 94 to capacitor 93. When the charge on capacitor 93 attains a level greater than the breakover voltage of breakover diode 84, current flows through a blocking diode 95 and breakover diode 84 to produce a triggering signal in transformer 91. The resistance of resistor 94 and the capacitance of capacitor 93 are selected to provide a time delay of several times the expected charging time of timing capacitor 56 so that operation of the delayed pulse generating means occurs if the motor synchronizes by itself.

Figure 2A:
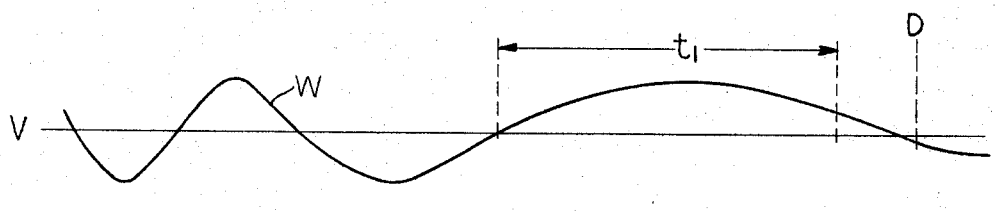

The usually occurring condition is shown in FIG. 2A. When the induced field current voltage W across discharge resistor 22 is positive, timing capacitor 56 is charging. When the wave length of any positive half cycle of the induced field current voltage exceeds a preselected time, such as $t_1$, the latching circuit is latched on and breakover diode 84 conducts when voltage W goes negative as shown at point D.

Figure 2B:
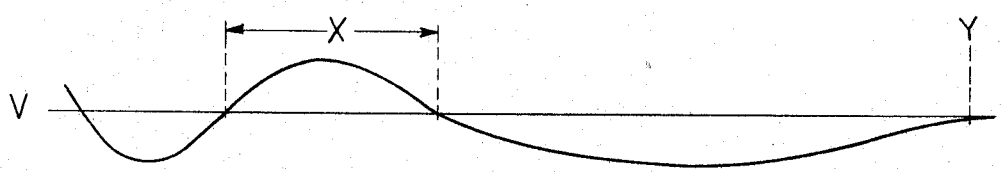

If no induced field current is produced because the motor rapidly synchronizes by itself or if the condition as shown in FIG. 2B occurs, breakover diode 84 will be turned on by the discharge of capacitor 93. With the condition shown in FIG. 2B, the time of positive half cycle X is less than time $t_1$ and the latching is not turned on because of the discharge of capacitor 56 before it reaches the latching level. However, timing capacitor 56 begins charging at point Y and the latching circuit turns on to charge capacitor 93. The time constant of resistor 94 and capacitor 93 is long compared to time $t_1$ so that it fires breakover diode 84 only under self-synchronizing conditions.

The triggering signal applied to transformer 91 appears at the secondary windings 91s, 91t and 91u. A secondary winding is provided for each thyristor that is utilized in the switching circuit. Three thyristors are shown but fewer or more could be used depending on the voltage requirements of the particular circuit. Considering the control circuit for thyristor 17, a pulse appears across secondary winding 91s in a direction to apply a positive pulse to the gate of thyristor 17 to turn it on. This pulse is passed through a diode 34, that is used to prevent interaction of the thyristors in the event of negative reset, and appears across a leakage resistor 35. This pulse turns on SCR 17 and the pulses at windings 91t and 91u turn on thyristors 18 and 19, respectively, to connect the exciter to the field winding. Resistor turn-off 96 and 98 and a capacitor 97 provide for thyristor voltage balance during the turn-on and transient conditions.

Discharge switching means 24 operates to disconnect discharge resistor 22 from a field winding 20 and excitation source 10. When excitation source 10 is connected to winding 20, diode 26 is reverse biased and does not pass current. Thyristor 28 is controlled to turn on only when a voltage exists across field winding 20 that is at a preselected level above that of the exciter voltage. Therefore, when the induced field current produces a voltage above the preselected level, thyristor 28 turns on, but when this voltage is less than the turn-on level thyristor 28 does not turn on. By selecting the turn-on voltage to be above the exciter voltage, it is assured that thyristor 17, 18 and 19 are turned off before thyristor 28 turns on.

During the starting period, a positive pulse is applied to the gate terminal of thyristor 28. This positive pulse appears across a leakage resistor 25. A blocking diode 27 and a dropping resistor 29 provide holding current through thyristor 28 for a time sufficient to assure the turn-on of thyristor 28. The turn-on circuit comprises a relatively small capacitor 36 connected in parallel with a relatively large resistance 38 and a relatively large capacitor 37 connected in parallel with a relatively small resistance 39. By selecting the proper ratio of capacitors 36 and 37, the voltage across thyristor 28 at which a breakover diode 23 conducts can be selected. This voltage is selected to turn on thyristor 28 at some voltage greater than that of excitation source 10.

In describing the invention, the preferred embodiment has been shown and described, but it is obvious to one skilled in the art that there are many variations, combinations, alterations and modifications that may be made without departing from the spirit of the invention, or from the scope of the appended claims.

The embodiments of the invention in which an exclusive property or privilege is claimed are defined as follows:

I claim:

1. Means for applying excitation power to the field winding of a synchronous motor, said means comprising:
   sensing means responsive to current induced in the field winding for producing a first output when the induced current is at one polarity and also when there is no induced field current and for producing a second output when the induced current is at another polarity;
   measuring means responsive to the sensing means output for producing a timing output when the first output occurs for a preselected time;
   latching means for producing and maintaining an output in response to the timing output;
   means responsive to the second output and the latching means output for producing a triggering signal in response to the simultaneous occurrence of said second output and said latching means output; and
   means responsive to the triggering signal for connecting the excitation source to the field winding.

2. Means for applying excitation power to the field winding of a synchronous motor, said means comprising:
   sensing means responsive to current induced in the field winding for producing a first output when the induced current is at one polarity and also when there is no induced field current and for producing a second output when the induced current is at another polarity;
   measuring means responsive to the sensing means output for producing a timing output when the first output of said sensing means occurs for a first preselected time;
   latching means for producing and maintaining an output in response to the timing output;
   means responsive to the simultaneous occurrence of the latching means output and the second output of said sensing means for substantially immediately producing a first triggering signal;
   means responsive to the occurrence of the first output of said sensing means for producing a second triggering signal after a second preselected time, substantially greater than said first preselected time required to produce the timing output; and
   means responsive to either the first or the second triggering signal for connecting the excitation source to the field winding.

3. Means for applying excitation power to the field winding of a synchronous motor, said means comprising:
   sensing means responsive to current induced in the field winding for producing a first output when the induced current is at one polarity and also when there is no induced field current and for producing a second output when the induced current is at another polarity;
   measuring means responsive to the sensing means output for producing a timing output when the first output of said sensing means occurs for a first preselected time;
   latching means for producing and maintaining an output in response to the timing output;
   means responsive to the simultaneous occurrence of the latching means output and the second output of said sensing means for substantially immediately producing a first triggering signal;
   means responsive to the occurrence of the first output of said sensing means for producing a second triggering signal after a second preselected time, substantially greater than said first preselected time required to produce the timing output;
   means responsive to the latching means output for maintaining the means for producing a first triggering signal at a condition to produce a first triggering signal upon every initiation of the second output of said sensing means; and
   means responsive to either the first or the second triggering signal for connecting the excitation source to the field winding.

4. Means for applying excitation power to the field winding of a synchronous motor, said means comprising:
   means responsive to current induced in the field winding for producing a first output when the induced current is at one polarity and also when there is no induced field current and for producing a second output when the induced current is at another polarity;
   measuring means responsive to the sensing means output for producing a timing output when the first output of said sensing means occurs for a first preselected time;
   latching means for producing and maintaining an output in response to the timing output;
   a transistor switching circuit connected to be responsive to the turning on of the latching means and to the occurrence of the second output of said sensing means to turn on;
   a first resistance-capacitance circuit connected to be charged when the transistor switching circuit turns on, said resistance-capacitance circuit selected to be charged to a first preselected level substantially instantaneously relative to the wave length of the induced field current wave;
   a second resistance-capacitance circuit connected to be charged when the latching means is turned on, said second resistance-capacitance circuit charging to a second preselected level after a time period of several times the first preselected time required to produce the timing output;
   a breakover diode connected in parallel with the capacitances of the first and second resistance-capacitance circuit with said breakover diode selected to breakover at the first and the second preselected level of charge respectively on said capacitances;

means responsive to the breakover of the breakover diode to produce a triggering signal; and means for connecting the excitation source to the field winding in response to the triggering signal.

5. Means for connecting an excitation power source to the field winding of a synchronous motor, said means comprising:

a discharge resistor;

an excitation power source;

means for connecting the discharge resistor to the field winding; said means for connecting comprising means for passing induced current of one polarity through said discharge resistor and means for passing induced current of another polarity through the discharge resistor only when the induced voltage exceeds the maximum applied excitation voltage, said another polarity selected to the same polarity as the polarity of the excitation source;

sensing means responsive to the polarity of the induced field current to produce a first output when the polarity of said induced current is the same as the polarity of the excitation source and also when there is substantially no induced field current, and to produce a second output when the induced field current is of a polarity opposite to the polarity of said excitation source;

measuring means receiving the sensing means output for producing a timing output when the first output of said sensing means has existed for a first preselected time;

latching means for producing a continuous output, said latching means responsive to the timing means for producing said continuous output after receipt of said timing output;

means responsive to the simultaneous occurrence of the latching means output and the second output of said sensing means for substantially immediately producing a first triggering signal;

means responsive to the occurrence of the first output of said sensing means for producing a second triggering signal after a second preselected time substantially greater than said first preselected time required to produce the timing output;

means responsive to either the first or the second triggering signal for connecting the excitation source to the field winding.

6. Means for connecting an excitation power source to the field winding of a synchronous motor, said means comprising:

a discharge resistor;

an excitation power source;

means for connecting the discharge resistor to the field winding, said means for connecting comprising means for passing induced current of one polarity through said discharge resistor and means for passing induced current of another polarity through the discharge resistor only when the induced voltage exceeds the maximum applied excitation voltage, said another polarity selected to be the same polarity as the polarity of the excitation source;

sensing means responsive to the polarity of the induced field current to produce a first output when the polarity of said induced current is the same as the polarity of the excitation source and also when there is substantially no induced field current, and to produce a second output when the induced field current is of a polarity opposite to the polarity of said excitation source;

measuring means receiving the sensing means output for producing a timing output when the first output of said sensing means has existed for a first preselected time;

latching means for producing a continuous output, said latching means responsive to the timing means for producing said continuous output after receipt of said timing output;

means responsive to the simultaneous occurrence of the latching means output and the second output of said sensing means for substantially immediately producing a first triggering signal;

means responsive to the occurrence of the first output of said sensing means for producing a second triggering signal after a second preselected time substantially greater than said first preselected time required to produce the timing output;

means responsive to the latching means output for maintaining the means for producing a first triggering signal at a condition to produce a first triggering signal upon every initiation of the second output of said sensing means; and means responsive to either the first or the second triggering signal for connecting the excitation source to the field winding.

7. Means for connecting an excitation power source to the field winding of a synchronous motor, said means comprising:

a discharge resistor;

an excitation power source;

means for connecting the discharge resistor to the field winding, said means for connecting comprising means for passing induced current of one polarity through said discharge resistor and means for passing induced current of another polarity through the discharge resistor only when the induced voltage exceeds the maximum applied excitation voltage, said another polarity selected to be the same polarity as the polarity of the excitation source;

sensing means responsive to the polarity of the induced field current to produce a first sensing output when the polarity of said induced current is the same as the polarity of the excitation source and when there is substantially no induced field current, and to produce a second output when the induced field current is of a polarity opposite to the polarity of said excitation source;

a first transistor switching circuit connected to receive and be responsive to the sensing means output to turn off when receiving the first sensing means output and to turn on when receiving the second sensing means output;

a first adjustable resistance-capacitance timing circuit connected to be charged from an electrical source with said capacitance connected across the output of the first transistor switching circuit;

latching means connected to respond to a preselected charge on the capacitance of the first resistor-capacitance circuit to turn on and remain on;

a second transistor switching circuit connected to be responsive to the turning on of the latching means and to the second sensing means output to turn on;

a second resistance-capacitance circuit connected to be charged when the second transistor switching circuit is turned on, and said second resistance-capacitance circuit selected to be charged to a preselected level substantially instantaneously relative to the wave length of the induced field current wave;

a third resistance-capacitance circuit connected to be charged when the latching means is turned on, said third resistance-capacitance circuit charging to the preselected level after a time period of several times the charging time of the capacitance of the second resistance-capacitance circuit;

a breakover diode connected in parallel with the capacitances of the second and third resistance-capacitance circuit with said breakover diode selected to breakover at the preselected charge level on either of said capacitances;

means responsive to the breakover of the breakover diode to produce a triggering signal; and means for connecting the excitation source to the field winding in response to the triggering signal.

8. Means for connecting an excitation power source to the field winding of a synchronous motor, said means comprising:

a discharge resistor;

an excitation power source;

means for connecting the discharge resistor to the field winding, said means for connecting comprising means for passing induced current of one polarity through said discharge resistor and means for passing induced current of another polarity through the discharge resistor only when the induced voltage exceeds the maximum applied excitation voltage, said another polarity selected to be the same polarity as the polarity of the excitation source;

a first transistor switching circuit connected to the discharge resistor to be turned on when the polarity of said induced current is the same as the polarity of the excitation source and forward biased to be turned on when there is substantially no induced field current, and to be turned off when the induced field current is of a polarity opposite to the polarity of said excitation source at a level sufficient to overcome the forward bias;

a second transistor switching circuit connected to be responsive to the condition of the first transistor switching circuit and to turn on when said first transistor switching circuit is turned off and to turn off when said first transistor switching circuit is turned on;

a first adjustable resistance-capacitance timing circuit connected to be charged from an electrical source with said capacitance connected across the output of the second transistor switching circuit;

latching means connected to respond to a preselected charge on the capacitance of the first resistor-capacitance circuit to turn on and remain on;

a third transistor switching circuit connected to be responsive to the turning on of the latching means and the turning off of the first transistor switching circuit to turn on;

a second resistance-capacitance circuit connected to be charged when the third transistor switching circuit turns on, said resistance-capacitance circuit selected to be charged to a preselected level substantially instantaneously relative to the wave length of the induced field current wave;

a third resistance-capacitance circuit connected to be charged when the latching means is turned on, said third resistance-capacitance circuit charging to a preselected level after a time period of several times the charging time of the capacitance of the second resistance-capacitance circuit;

a breakover diode connected in parallel with the capacitances of the second and third resistance-capacitance circuit with said breakover diode selected to breakover at the preselected level of charge on either of said capacitances;

means responsive to the breakover of the breakover diode to produce a triggering signal; and a thyristor switching circuit for connecting the excitation source to the field winding, said thyristor circuit connected to be gated on by the triggering signal.

9. Means for connecting an excitation power source to the field winding of a synchronous motor, said means comprising:

a discharge resistor;

an excitation power source connectable to the field winding;

means for connecting the discharge resistor to the field winding, said means for connecting comprising a diode and a thyristor connected in parallel to each other and in series between the discharge resistor and the field winding with the diode and thyristor connected to pass current of opposite polarities with said thyristor poled to pass current in the same direction as the excitation source, and means connected to turn on the thyristor at a voltage selected to be greater than the voltage of the excitation source;

sensing means responsive to the polarity of the induced field current to produce a first sensing output when the polarity of said induced current is the same as the polarity of the excitation source and also when there is substantially no induced field current, and to produce a second output when the induced field current is of a polarity opposite to the polarity of said excitation source;

measuring means receiving the sensing means output for producing a timing output when the first output of said sensing means has existed for a first preselected time;

latching means for producing a continuous output, said latching means responsive to the timing means for producing said continuous output after receipt of said timing output;

means responsive to the simultaneous occurrence of the latching means output and the second output of said sensing means for substantially immediately producing a first triggering signal;

means responsive to the occurrence of the first output of said sensing means for producing a second triggering signal after a second preselected time substantially greater than said first preselected time required to produce the timing output;

means responsive to the latching means output for maintaining the means for producing a first triggering signal at a condition to produce a first triggering signal upon every initiation of the second output of said sensing means; and means responsive to either the first or the second triggering signal for connecting the excitation source to the field winding.

10. Means for connecting an excitation power source to the field winding of a synchronous motor, said means comprising:

a discharge resistor;

an excitation power source connectable to the field winding;

means for connecting the discharge resistor to the field winding, said means for connecting comprising a diode and a thyristor connected in parallel to each other and in series between the discharge resistor and the field winding with the diode and thyristor connected to pass current of opposite polarities, with said thyristor poled to pass current in the same direction as the excitation source, and means connected to turn on the thyristor at a voltage selected to be greater than the voltage of the excitation source;

a transistor switching circuit connected to the discharge resistor to be turned on when the polarity of said induced current is the same as the polarity of the excitation source and forward biased to be turned on when there is substantially no induced field current, and to be turned off when the induced field current is of a polarity opposite to the polarity of said excitation source at a sufficient level to overcome the forward bias;

measuring means connected to the transistor switching circuit for producing a timing output when said transistor switching circuit has been turned on for a preselected time;

latching means for producing a continuous output, said latching means responsive to the timing means for producing said continuous output after receipt of said timing output;

means responsive to the simultaneous occurrence of the latching means output and the turning off of the transistor switching circuit for substantially immediately producing a triggering signal;

means responsive to the turning off of the transistor switching circuit for producing a triggering signal after a preselected time, said preselected time substantially greater than the preselected time of turn-on of the transistor switching circuit required to produce the timing output;

means responsive to the latching means output for maintaining the means for producing a triggering signal at a condition to produce a triggering signal upon each occurrence of the second sensing output; and means responsive to the triggering signal for connecting the excitation source to the field winding.

11. Means for connecting an excitation power source to the field winding of a synchronous motor, said means comprising:

a discharge resistor;

an excitation power source connectable to the field winding;

means for connecting the discharge resistor to the field winding, said means for connecting comprising a diode and a thyristor connected in parallel to each other and in series between the discharge resistor and the field winding with the diode and thyristor connected to pass current of opposite polarities with said thyristor poled to pass current in the same direction as the excitation source, and means connected to turn on the thyristor at a voltage selected to be greater than the voltage of the excitation source;

a first transistor switching circuit connected to the discharge resistor to be turned on when the polarity of said induced current is the same as the polarity of the excitation source and forward biased to be turned on when there is substantially no induced field current, and to be turned off when the induced field current is of a polarity opposite to the polarity of said excitation source at a sufficient level to overcome the forward bias;

a second transistor switching circuit connected to be responsive to the condition of the first transistor switching circuit to turn on when said first transistor switching circuit is turned off and to turn off when said first transistor switching circuit is turned on;

a first adjustable resistance-capacitance timing circuit connected to be charged from an electrical source with said capacitance connected across the output of the second transistor switching circuit;

latching means connected to respond to a preselected charge on the capacitance of the first resistor-capacitance circuit to turn on and remain on;

a third transistor switching circuit connected to be responsive to the turning on of the latching means and the turning off of the first transistor switching circuit to turn on;

a second resistance-capacitance circuit connected to be charged when the third transistor switching circuit turns on, said resistance-capacitance circuit selected to be charged to a preselected level substantially instantaneously relative to the wave length of the induced field current wave;

a third resistance-capacitance circuit connected to be charged when the latching means is turned on, said third resistance-capacitance circuit charging to a preselected level after a time period of several times the charging time of the capacitance of the second resistance-capacitance circuit;

a breakover diode connected in parallel with the capacitance of the second and third resistance-capacitance circuit with said breakover diode selected to breakover at the preselected level of charge on either of said capacitances;

means responsive to the breakover of the breakover diode to produce a triggering signal; and a thyristor switching circuit for connecting the excitation source to the field winding, said thyristor circuit connected to be gated on by the triggering signal.

References Cited

UNITED STATES PATENTS

| | | | |
|---|---|---|---|
| 3,100,279 | 8/1963 | Rohner | 318—181 XR |
| 3,308,362 | 3/1967 | Neumann et al. | 318—193 XR |

ORIS L. RADER, *Primary Examiner.*

G. RUBINSON, *Assistant Examiner.*